Figure 1:
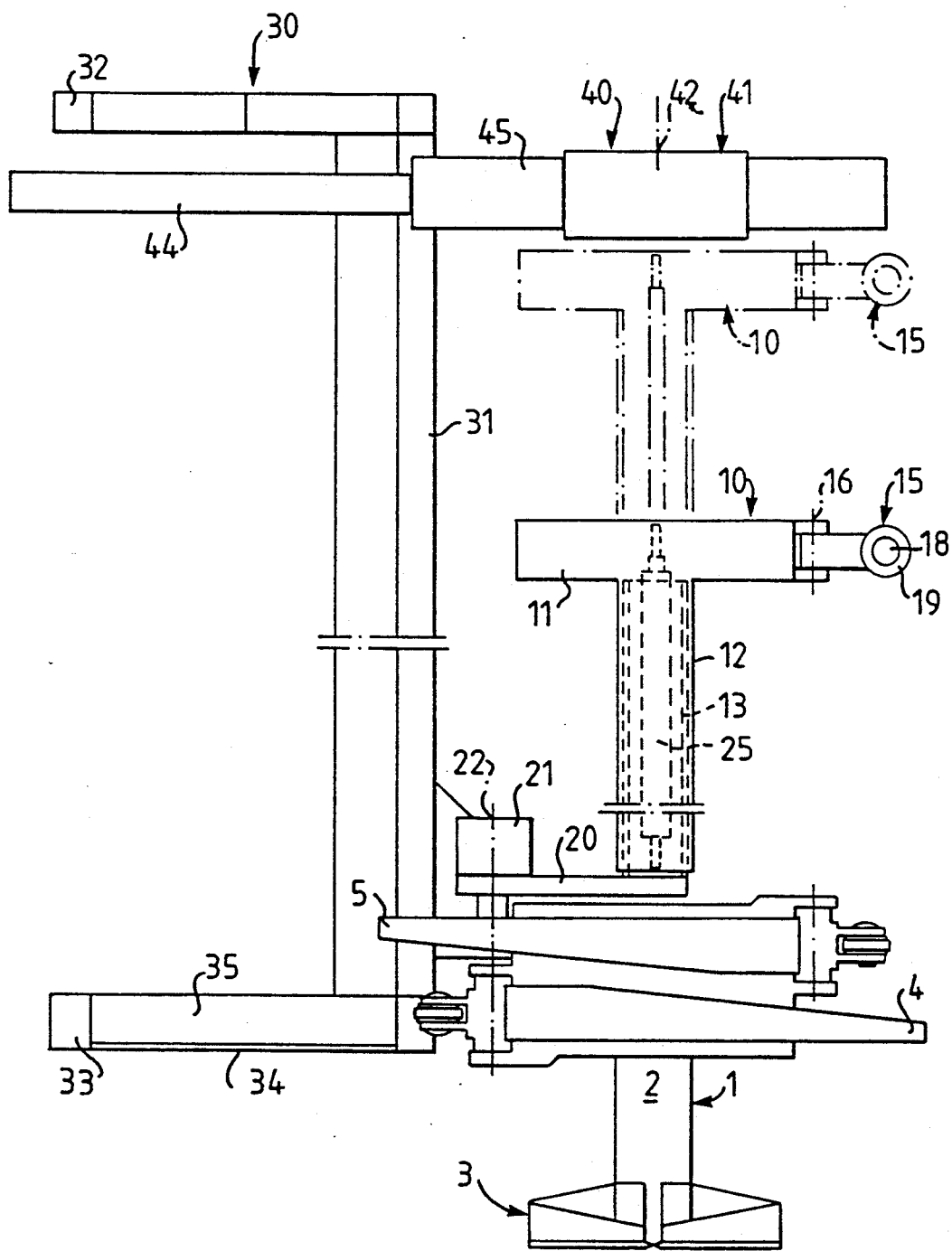

United States Patent [19]

Widegren

[11] Patent Number: 5,083,595

[45] Date of Patent: Jan. 28, 1992

[54] TREE HARVESTING APPARATUS

[76] Inventor: Lars Widegren, Arent Grapegatan 31, S-981 32 Kiruna, Sweden

[21] Appl. No.: 659,371

[22] PCT Filed: Aug. 28, 1989

[86] PCT No.: PCT/SE89/00450

§ 371 Date: Feb. 21, 1991

§ 102(e) Date: Feb. 21, 1991

[87] PCT Pub. No.: WO90/01867

PCT Pub. Date: Mar. 8, 1990

[30] Foreign Application Priority Data

Aug. 29, 1988 [SE] Sweden .................. 8803010

[51] Int. Cl.$^5$ .............................. A01G 23/08
[52] U.S. Cl. .................. 144/3 D; 144/34 R; 144/336
[58] Field of Search .......... 144/2 Z, 3 D, 34 R, 144/34 E, 335, 336; 294/106; 414/739

[56] References Cited

U.S. PATENT DOCUMENTS

| | | | |
|---|---|---|---|
| 3,371,692 | 3/1968 | Larson et al. | 144/34 R |
| 3,875,983 | 4/1975 | Kurelek | 144/34 R |
| 3,910,326 | 10/1975 | Tucek | 144/34 E |
| 3,911,981 | 10/1975 | Tucek | 144/34 E |
| 4,153,087 | 5/1979 | Stoychoff | 144/34 E |
| 4,243,258 | 1/1981 | Dauwalder | 144/34 E |

Primary Examiner—W. Donald Bray
Attorney, Agent, or Firm—Michael, Best & Friedrich

[57] ABSTRACT

A tree harvester including gripping arms (4, 5) a cutting tool (3), and a primary tree-holding device (10) for the accumulation of harvested trees. The primary holding device includes a pivotal tree-holding member (15) having an axially extensible arm (18) and functioning to hold the accumulated trees firmly against an abutment (11) provided on the primary holding device (10). The harvester also includes a magazine (30) in which harvested trees are collected, and a secondary tree-holding device (40) by means of which the trees are retained in the magazine. The secondary holding device includes a pivotal tree-holding member (41) provided with an axially extensible arm (44) operative to hold the trees collected in the magazine (30). The abutment (11) and the holding member (15) of the primary holding device (10) can be displaced vertically in relation to the gripping arms (4, 5) and are pivotal about a vertical axis (22), between a position above the gripping arms (4, 5) and a position located in the magazine (30).

11 Claims, 3 Drawing Sheets

TREE HARVESTING APPARATUS

The present invention relates to an arrangement in tree-harvesting apparatus of the kind which include gripping arms and a cutting tool.

Various different kinds of vehicle-carried tree harvesting apparatus are known to the art, these apparatus normally being carried by a crane mounted on the vehicle. Such tree harvesters will include a cutting device, which is either operative to saw or to shear the tree, and gripping arms which hold the tree to the harvester, until the tree is deposited in the place desired. Tree harvesters are also known which pull trees from the ground, together with their roots, before cutting of the tree commences.

The object of the present invention is to provide a highly effective arrangement which can be used in conjunction with various types of tree harvesters. This object is fulfilled with the inventive arrangement having the characteristic features set forth in the following claims.

The inventive arrangement improves the efficiency of the tree harvester, in that the number of working steps required to effect a tree-harvesting operation is far fewer than was previously the case.

Figure 2:
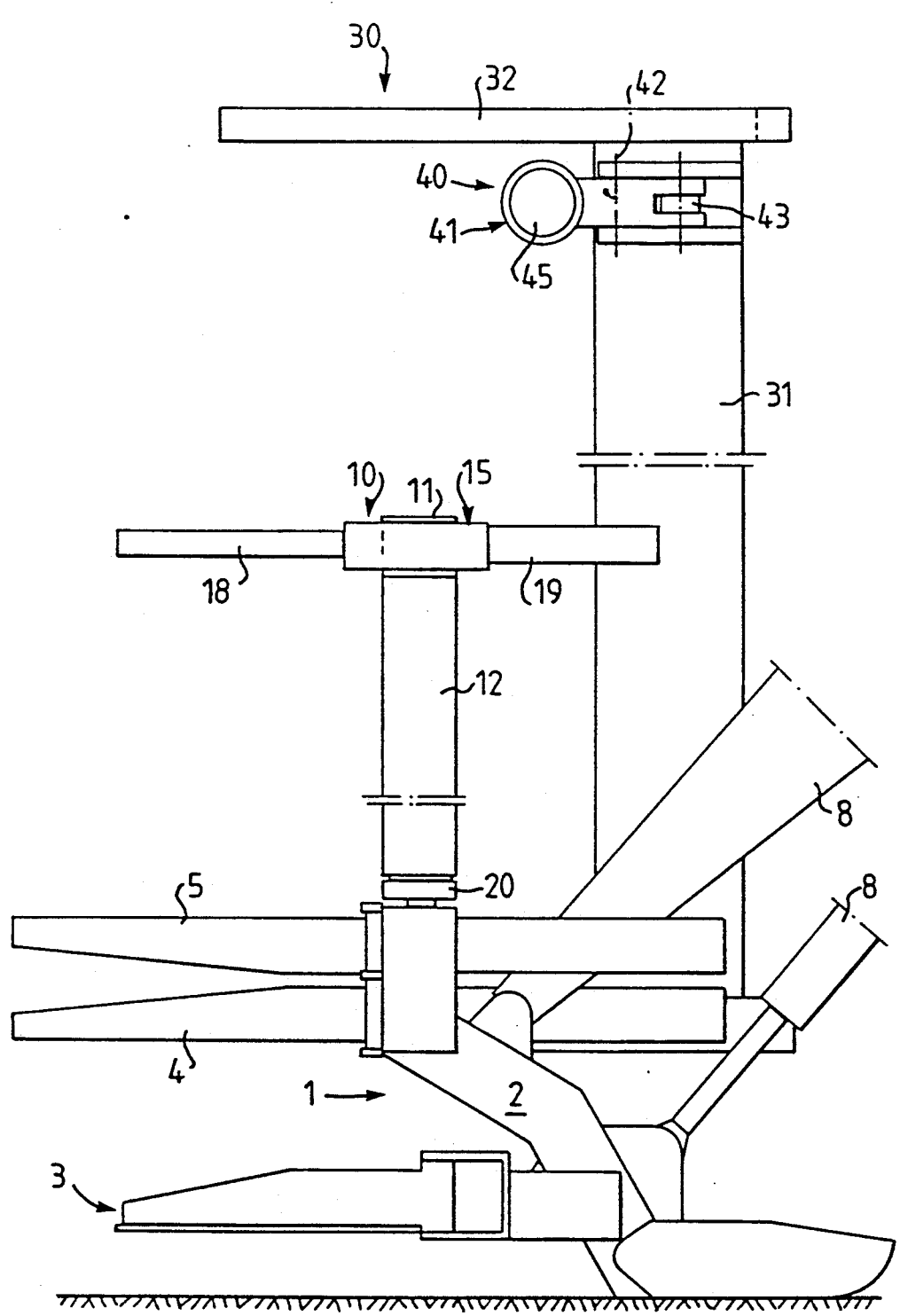
Figure 3:
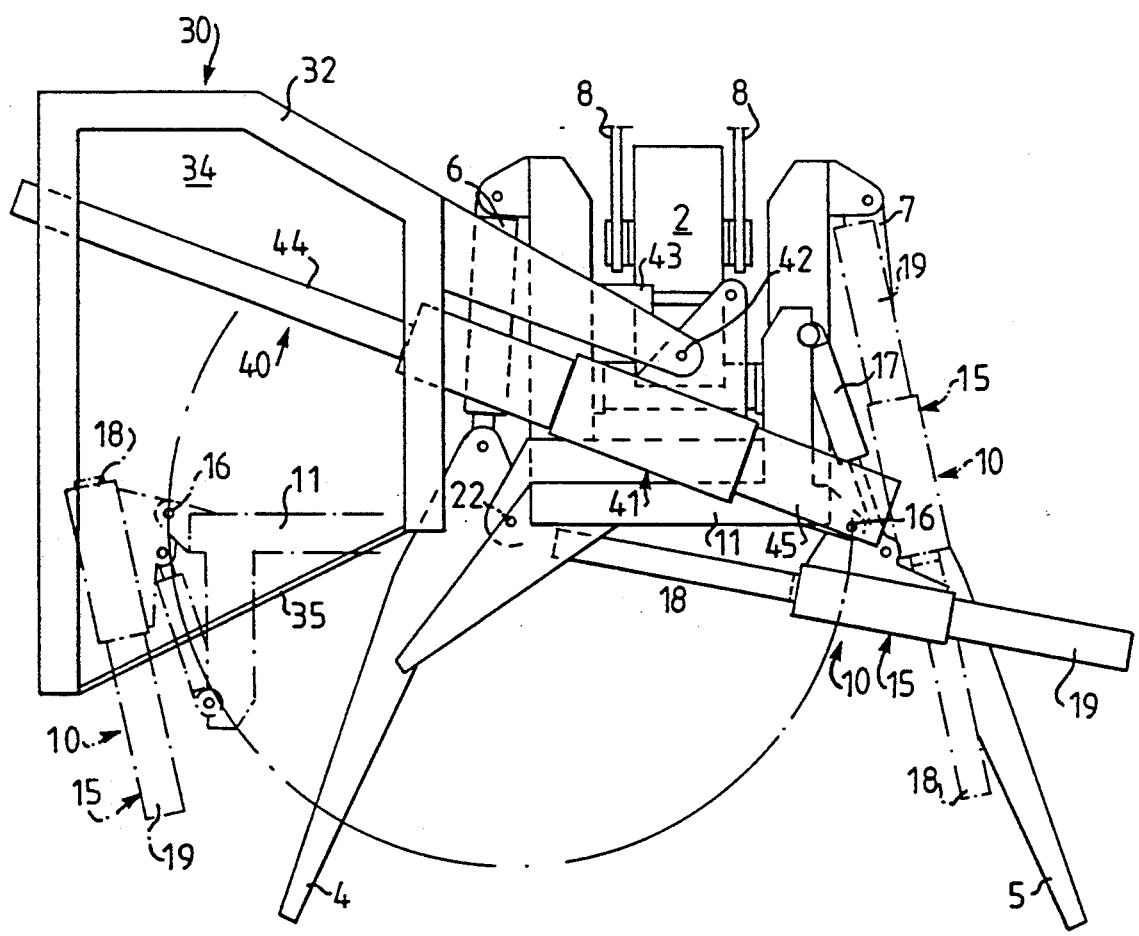

The invention will now be described in more detail with reference to an exemplifying embodiment thereof and also with reference to the accompanying drawings, in which FIG. 1 is a schematic front view of an exemplifying embodiment of the inventive arrangement, FIG. 2 illustrates the arrangement in side view and FIG. 3 illustrates the arrangement from above.

The tree harvester 1 illustrated schematically in the figures of the drawings includes a stand or like device 2 which carries, inter alia, a cutting tool 3 operative to shear or to saw the tree, and gripping arms 4, 5 which function to hold the tree on the harvester until the tree is deposited at some appropriate site. The gripping arms 4 and 5 are operated by means of hydraulic piston-cylinder devices 6 and 7, and are shown in FIG. 1 in their closed positions and in FIGS. 2 and 3 in their open positions.

The harvester 1 is normally carried by an off-road transport vehicle (not shown) provided with a crane arm 8, to which the harvester is connected, said harvester being moved between the trees with the aid of the crane arm and said vehicle.

Conventional tree harvesters are known to the person skilled in this art, and will therefore not be described in detail here.

The inventive arrangement includes a primary tree-holding device 10 which is mounted essentially immediately above the gripping arms 4 and 5 of the harvester 1. The holding device 10 includes an abutment means or counter-support 11 which is mounted on an outer tube 12 of square cross-section. An inner tube 13 of square cross-section forms means for guiding the outer tube 12.

The primary holding device 10 also includes a tree-holding member 15 which is pivotally connected to the abutment means 11, by means of a pivot pin 16. A hydraulic piston-cylinder device 17 acts between the abutment means 11 and the holding member 15 and is operative to swing the holding member 15 between a closed position shown in full lines in FIG. 3 and an open position, shown in chain lines in the same figure.

The holding member 15 can be extended telescopically, by virtue of an arm 18 which can be displaced axially between an inwardly retracted position and an outwardly extending position, said arm 18, for instance, comprising the piston rod of a hydraulic piston-cylinder device 19. The arm 18 is shown in its extended position in FIGS. 2 and 3.

The lower end of the inner tube 13 of square cross section is connected to a plate 20 which can be rotated through approximately one half of a revolution about a vertical axis 22, by means of a hydraulic turning motor 21. During this rotational movement of the plate, the primary holding device 10 can be swung so that the abutment means 11 and the holding member 15 will be located on one side of the tree harvester 1, as indicated in chain lines to the left of FIG. 3. The rotational axis 22 is located on the stand 2 of the harvester.

Acting between the tubes 12 and 13 is a hydraulic piston-cylinder device 25 which functions as a hoist when the primary holding device 10 is to be raised to an upper position, indicated in chain lines in FIG. 1.

The inventive arrangement also has a tree magazine 30. The magazine 30 is constructed about a pillar 31 connected to the stand 2. The pillar 31 carries an upper tree-collecting stirrup-shaped device 32 on its upper end, and a corresponding stirrup-shaped tree-collecting device 33 at its bottom end, these stirrup-shaped collecting devices delimiting the size of the magazine. Mounted in the vicinity of the lower collecting device 33 is a floor 34, which is made, for instance, of steel net and which is provided with a threshold 35 or like barrier device across the magazine opening.

The upper part of the magazine 30 carries a secondary tree-holding device 40, which includes a tree-holding member 41 and which is pivotally connected to the magazine 30 by means of a pivot pin 42. A hydraulic piston-cylinder device 43 acts between the magazine 30 and the holding device 41, such as to swing the holding device 41 to various positions in relation to the magazine.

Similar to the holding device 15, the holding device 41 is also telescopically extensible, by virtue of an arm 44 which can be displaced axially between an inwardly withdrawn position and an outwardly extending position, this arm 44 comprising, for instance, the piston rod of a hydraulic piston-cylinder device 45. FIGS. 1 and 3 show the arm 44 in its outwardly extending position.

The described construction operates in the following manner. The first tree to be harvested is gripped by the gripping arms 4 and 5 and severed at the root thereof by means of the cutting tool 3, the primary holding device 15 being in its open position, i.e. the position shown in chain lines to the right of FIG. 3. Before the tree is released by the gripping arms 4 and 5, the arm 18 is extended from the cylinder 19 and the holding device 15 is swung by means of the hydraulic piston-cylinder device 17, so that the arm 18 is brought into abutment with the tree and the tree is clamped firmly between the abutment means 11 and the arm 18. The gripping arms 4 and 5 are then opened, so as to enable the next tree to be gripped by the arms and subsequently cut. This second tree would therewith lie on the outside of the arm 18 so that the arm is clamped between the two trees, and in the next stage of operation the arm 18 is withdrawn into the cylinder 19, to its inwardly withdrawn position, and is therewith released from clamping engagement between the trees, whereafter the piston-cylinder device is activated so as to swing the holding device 15 outwards to its open position, as shown in chain lines to the right of FIG. 3. Immediately thereafter, the arm 18 is again extended from the cylinder 19 and the piston-cylinder device 17 functions to swing the holding device 15 inwardly, so that the arm 18 will press the two trees against the abutment or counter-support means 11, whereafter the gripping arms 4 and 5 can again be opened. This procedure is repeated until the number of trees accumulated between the holding device 15 and the abutment 11 is sufficient to fill the primary holding device 10.

The next operational stage is to transfer the collected bundle of trees from the primary holding device 10 to the tree magazine 30. This transfer is effected by first ensuring that the gripping arms 4 and 5 are open and then lifting the collected tree-bundle with the aid of the hoisting piston-cylinder device 25, so that the primary holding device 10 will be located in its upper position, shown in chain lines in FIG. 1, with the lower end of the tree-bundle located above the gripping arm 4. The primary holding device 10 is then rotated by the motor 21 about the axis 22, so as to move the wood-bundle to the magazine 30 and so that said wood-bundle is located within the confines of the stirrup-like collecting device 32 and in contact with the rear part of said device, whereafter the wood-bundle is lowered with the aid of the hoisting cylinder 25, such that the lower end part of the wood-bundle rests against the floor 34 of the magazine 30. The arm 44 of the secondary holding device 40 is then extended, whereafter the holding member 41 is swung about the axis 42, by means of the piston-cylinder device 43, to a position in which the arm 44 of the holding member 41 clamps the tree-bundle against the two stirrup-like collecting devices 32 and 33. The arm 18 of the holding member 15 is then withdrawn to its inner position and the primary holding device 10 is removed to its starting position above the gripping arms 4 and 5, by means of the motor 21 and the hoisting cylinder 25.

When a further wood-bundle has been accumulated in the primary holding device 10, this bundle is transferred to the magazine 30 in the aforedescribed manner, the arm 44 of the holding member 41 being clamped between the wood-bundles. In the following stages of operation, the arm 44 of the secondary holding device 40 is withdrawn, the holding member 41 is swung outwards, the arm 44 is extended, and the holding member 41 is then swung inwards so that the arm 44 will hold the two wood-bundles in the magazine 30. The primary holding device 10 is then again moved to its original position above the gripping arms 4 and 5. This procedure is repeated until the magazine 30 has been filled with wood-bundles, whereafter the trees are deposited at a desired location, by forwardly inclining the magazine with the aid of the vehicle crane 8 while moving the secondary holding device 40 to its open position at the same time.

Subsequent to depositing the trees, the magazine 30 is again filled with trees in the aforedescribed manner, this procedure being repeated ad infinitum.

In accordance with a simpler embodiment of the invention, the magazine 30 and the secondary holding device 40 are omitted. In the case of this latter embodiment, the primary holding device 10 is simplified by the fact that the hoisting movement performed by the hoisting cylinder 25 and the rotary movement performed by the turning motor 21 are no longer necessary. This enables the tube 12 to be connected directly to the stand 2.

This arrangement of simpler construction, however, will only enable trees to be accumulated in the primary holding device 10, in accordance with the aforedescribed procedure, and depositing of the accumulated trees in said desired location is effected by forwardly inclining the arrangement with the aid of the vehicle crane 8, while moving the holding member 15 of the primary holding device 10 to its open position at the same time.

Subsequent to depositing the trees, a further tree-bundle can be accumulated in the primary holding device 10, in the aforedescribed manner, this procedure being repeated ad infinitum.

It will be understood that the inventive arrangement can be used as a supplementary arrangement in various different kinds of tree harvesters, and hence the illustrated embodiment of the tree harvester itself shall not be considered limitive of the scope of the invention.

It will also be understood that the hydraulic components described above can be replaced with other appropriate operating devices without departing from the scope of the invention.

The invention is therefore not limited to the described and illustrated embodiments, since modifications and changes can be made within the scope of the following claims.

I claim:

1. Apparatus for use with a tree harvester including gripping arms (4, 5) which can be swung transversely to the longitudinal axis of the trees, and a cutting tool (3), said apparatus comprising a tree-holding device (10) for the accumulation of harvested trees, said device including an abutment member (11), a tree-holding member (15), and means for pivoting said holding member transversely to the longitudinal axis of said trees, characterized in that the holding member (15) includes an arm (18) which extends transversely to the longitudinal axis of the trees, and means for displacing said arm longitudinally between a inwardly withdrawn position and an outwardly extended position such that said arm (18) accompanies the pivotal movement of the holding member (15) so that said arm, in said extended position, holds the accumulated trees firmly against said abutment (11).

2. Apparatus according to claim 1, characterized in that the longitudinally displaceable arm is the piston rod (18) of a hydraulic piston-cylinder device (19).

3. Apparatus according to claim 1, and further comprising means for displacing the abutment (11) and the holding member (15) in relation to the gripping arm (4, 5) in the direction of the longitudinal axis of the trees.

4. Apparatus according to claim 1, and further comprising means for pivoting the abutment (11) and the holding member (15) about an axis (22) which extends parallel with the longitudinal axis of the trees, between a position above the gripping arms (4, 5) and a laterally located magazine (30).

5. Apparatus according to claim 2, and further comprising means for displacing the abutment (11) and the holding member (15) in relation to the gripping arms (4, 5) in the direction of the longitudinal axis of the trees.

6. Apparatus according to claim 2, and further comprising means for pivoting the abutment (11) and the holding member (15) about an axis (22) which extends parallel with the longitudinal axis of the trees, between a position above the gripping arms (4, 5) and a laterally located magazine (30).

7. Apparatus according to claim 3, wherein said means for displacing the abutment (11) and the holding member (15) pivots the abutment and the holding member about an axis (22) which extends parallel with the longitudinal axis of the trees, between a position above the gripping arms (4, 5) and a laterally located magazine (30).

8. A tree harvester for harvesting trees having longitudinal axes, said tree harvester comprising gripping arms, means for pivoting said gripping arms transversely to the longitudinal axes of the trees, a cutting tool, and a tree holding device for accumulating harvested trees, said device including an abutment member, a tree holding member, and means for pivoting said holding member transversely to the longitudinal axes of the trees, said holding member including an arm extending transversely to the longitudinal axes of the trees, and means for displacing said arm longitudinally between an inwardly withdrawn position and an outwardly extended position such that said arm, in said extended position, holds accumulated trees against said abutment.

9. A tree harvester according to claim 8 and further comprising means for displacing said abutment and said holding member in relation to said gripping arms in the direction of the longitudinal axes of the trees.

10. A tree harvester according to claim 9 wherein said means for displacing said abutment and said holding member pivots said abutment and said holding member about an axis which extends parallel with the longitudinal axes of the trees, between a position above said gripping arms and a laterally located magazine.

11. A tree harvester according to claim 8 and further comprising means for pivoting said abutment and said holding member about an axis which extends parallel with the longitudinal axes of the trees, between a position above said gripping arms and a laterally located magazine.

* * * * *